United States Patent

Brinkmeyer et al.

Patent Number: 5,983,347
Date of Patent: Nov. 9, 1999

[54] AUTHENTICATION DEVICE WITH ELECTRONIC AUTHENTICATION COMMUNICATION

[75] Inventors: Horst Brinkmeyer, Waiblingen; Michael Daiss, Filderstadt; Guenter Schwegler, Weinstadt, all of Germany

[73] Assignee: DaimlerChrysler AG, Germany

[21] Appl. No.: 08/908,792

[22] Filed: Aug. 8, 1997

[30] Foreign Application Priority Data

Aug. 8, 1996 [DE] Germany ............... 196 32 025

[51] Int. Cl.[6] ............... G06F 11/00; H04L 9/00
[52] U.S. Cl. ............... 713/200; 340/426; 340/435; 340/542; 340/825.32; 340/825.36; 340/825.44; 307/10.2
[58] Field of Search ............... 395/186; 340/426, 340/435, 505, 542, 825.31, 825.32, 825.34, 825.36, 825.44, 825.49, 825.54, 825.87; 307/10.2

[56] References Cited

U.S. PATENT DOCUMENTS

| | | | |
|---|---|---|---|
| 5,513,105 | 4/1996 | Krones et al. | 364/424.01 |
| 5,596,317 | 1/1997 | Brinkmeyer | 340/825.31 |
| 5,604,803 | 2/1997 | Aziz | 380/25 |
| 5,619,573 | 4/1997 | Brinkmeyer et al. | 380/23 |
| 5,708,712 | 1/1998 | Brinkmeyer et al. | 380/23 |
| 5,712,626 | 1/1998 | Andreou et al. | 340/825.31 |
| 5,723,911 | 3/1998 | Glehr | 307/10.2 |
| 5,774,550 | 6/1998 | Brinkmeyer et al. | 380/21 |
| 5,838,251 | 11/1998 | Brinkmeyer et al. | 340/825.31 |
| 5,883,443 | 3/1999 | Wilson | 307/10.2 |
| 5,889,472 | 3/1999 | Nagel et al. | 340/825.31 |

FOREIGN PATENT DOCUMENTS

| | | |
|---|---|---|
| 2838056 B1 | 8/1979 | Germany. |
| 3500353 A1 | 7/1986 | Germany. |
| 0218251 B1 | 12/1988 | Germany. |
| 4234822 A1 | 4/1993 | Germany. |

*Primary Examiner*—Robert W. Beausoliel, Jr.
*Assistant Examiner*—Scott T. Baderman
*Attorney, Agent, or Firm*—Evenson, McKeown, Edwards & Lenahan, P.L.L.C.

[57] ABSTRACT

An electronic authentication device has an authentication key unit for user authentication with respect to the target unit, which key unit communicates electronically with the target unit during an authentication communication process. An electronic authentication communication process is activated automatically when the key unit approaches the target unit or when a triggering element provided on the target unit is actuated. For increased protection against unauthorized authentication attempts, indicating apparatus are provided on the key unit to display the fact that an electronic authentication communication process is taking place. Also switching apparatus can be provided for allowing or blocking an authentication communication process, and a communication duration monitor can also be provided on the target unit to monitor the duration of an authentication communication process and block authentication if this duration exceeds a predetermined maximum duration.

8 Claims, 1 Drawing Sheet

AUTHENTICATION DEVICE WITH ELECTRONIC AUTHENTICATION COMMUNICATION

BACKGROUND AND SUMMARY OF THE INVENTION

This application claims the priority of German Application No. 19632025.9-53, filed Aug. 8, 1996, the disclosure of which is expressly incorporated by reference herein.

The invention relates to an authentication device for electronic authentication communication.

Devices of this kind are used for example in door-locking systems and electronic anti-theft systems on modern motor vehicles in order to allow activation of these systems only by an authorized person or persons. The vehicle-mounted part of the door-locking system and/or the electronic anti-theft system constitutes the authentication target unit to which the user must identify himself as authorized. For this purpose, he is provided with a corresponding authentication key unit, usually in the form of a so-called electronic key. Authentication involves an electronic authentication communication in which an encoded signal transmitted between the target unit and the key unit is used by the system to check whether the individual key unit (and hence the user possessing it) is authorized to perform certain actions with respect to the target unit, such as for example unlocking the door locks of the door-locking system or disarming the electronic anti-theft system. Devices with additional or exclusive electronic authentication communication offer higher protection against manipulation compared to purely mechanical authentication devices, like that provided for example by mechanical key and lock systems.

Authentication devices are known in which an operating element on the authentication key unit must be actuated by the user to activate an electronic authentication communications process. For example, in a device of this kind disclosed in DE 42 34 822 A1, a momentary contact switch is connected to a control unit of a transmitter that functions as a key unit. Activation of the momentary contact switch causes the transmitter to transmit a recognition code for a receiving target unit that checks the code it receives against a stored code to see whether they match. A light-emitting diode is also connected to the control unit, diode indicating the operating state of the transmitter.

By contrast with these so-called operable systems, the authentication devices according to the species (known as "operationless systems") offer a higher degree of operating comfort since when they are used, the authentication communication process does not require operation of the key unit but takes place either automatically with sufficient proximity of the key unit to the target unit or by actuation of a triggering element provided on the target unit.

During an electronic authentication communication process for example, an interrogation signal is initially transmitted from the target unit to the key unit via a wireless communication link. Upon receiving this signal, the key unit sends back an encoded signal that is decoded and verified in the target unit and may then provide the desired authorization of further actions. The interrogation signal from the target to the key unit can serve, for example, only to trigger the signal output in the key unit; it can also contain, however, information such as a random number that is processed further in the key unit (in other words is encoded). In addition, this signal can also represent an energy supply signal for the key unit on which information may be superimposed by modulation for example.

If the authentication communication process is to be activated automatically as soon as the key unit has come within a certain distance of the target unit, the target unit must transmit the introductory signal at least certain time intervals, which means a comparatively high energy requirement. Therefore, alternative systems have already been proposed in which a triggering element on the target unit must be actuated initially to activate the authentication communication process. Preferably, this triggering element is part of a mechanical authentication process that is provided in addition in any case, so that as a result there is effectively no additional operating process for the user. For example, the triggering element is actuated in the case of a door-locking system when a mechanical key part of the key unit is inserted into the lock of the target unit, when a door handle is operated to open the door, or when a light barrier in front of the door lock is broken. Authentication devices of the above-mentioned various types are disclosed, for example, in EP 0 218 251 B1; DE 35 00 353 A1 and DE 28 38 056 B1.

All of these conventional authentication devices have in common the fact that the electronic authentication communication proceeds automatically as far as the key element is concerned and hence unnoticed and uninfluenced by the user. This results in the following theoretical weaknesses in this system as far as protection against manipulation is concerned.

In systems with unidirectional code transmission, the key unit is activated by a triggering or energy signal from the target unit and then delivers encoded information, with signal transmission preferably taking place by electrical or magnetic waves. However, an unauthorized person with a unit that is functionally identical to the target unit but has a higher transmitting and receiving power, could approach the holder of an authorized key unit when the latter is still far from the target unit. He could then use his unit to call up the code information from the key unit and store it without the authorized user noticing anything. Then the unauthorized person can use the recorded code information to perform an authorizing electronic authentication communication process with the target unit.

In systems with bidirectional code data exchange, for example using electrical or magnetic waves, a first unauthorized individual with a first unit could call up the initial code information from the target unit and use a suitable transmitter to switch to a signal carrier suitable for long distances and retransmit the code. A second unauthorized individual could then use a second unit to receive this signal, change it to the signal suitable for the legitimate key unit, and transmit to the latter when he is in the vicinity of the key unit. The key unit then delivers its response signal which is conducted along the reverse transmission path to the target unit. In this way, two unauthorized individuals could release the target unit without authorization.

An object of the present invention is to provide an authentication device of the type recited at the outset, which prevents unnoticed electrical authentication communication by the key unit with the target unit, so that no authentication by unauthorized persons is possible, especially as a result of the two unauthorized types of manipulation described above.

This and other objects and advantages are achieved by the authentication arrangement according to the invention, in which unauthorized callup of authorization codes from a key unit and their storage in the target unit by unauthorized persons is prevented by at least one of three measures. First, an authentication communication process that is taking place in the key unit can be indicated by corresponding indicating means to the holder of the key unit, so that he is warned in proper time if a communication process is taking place without his involvement. Second, switching means can be provided on the key unit for allowing or blocking an authentication communications process. That is, the device can be designed so that the holder of the key unit can lock the unit to keep it from actuating the switching means if authentication communication processes occur during periods of time in which he is certain that no such communication processes are to take place. It should be noted that these switching means do not serve to trigger an authentication communication process, but the latter takes place automatically instead or by actuating a corresponding element on the authentication target unit. Alternatively, the device can be designed so that the switching means are actuated automatically in suitable fashion when the key unit is used in a way that is required in any event, for example when using a mechanical key part of the key unit in a mechanical lock on the target unit, so that no separate operating process for the user is required.

Finally, in addition to or instead of the above means, a communication duration monitoring device can be provided on the authentication target unit, which monitors the duration of an authentication communication process. In the case of unauthorized communication attempts of the type described above, the communication duration will be lengthened in comparison with normal authorized communication processes, because of the longer transmission distance and/or the required signal conversion. By setting a suitable maximum duration for an authentication communication process, the monitoring means can recognize an unauthorized communication attempt, so that these means serve to block the authentication at the target unit.

In one embodiment of the invention, the display means incorporate an acoustic and/or optical signaling device which is activated during each authentication communication process for a certain space of time and informs the user of the key unit acoustically and/or optically that an authentication communication is taking place.

Another embodiment of the invention also includes mechanical authentication actuation of the key unit on the target unit as a prerequisite for subsequent activation of an electronic authentication communication process. A switching element is provided on the key unit that, as a result of the mechanical authentication actuation of the key unit on the target unit, is automatically actuated as well and thereby authorizes an electronic authentication communication process that it would otherwise block. In this manner, the key unit is protected against the elicitation of authentication information so long as it is not brought into active connection mechanically with the target unit.

In still another embodiment, the maximum communication time provided for the communication time monitoring device is set for a normal authentication process, in which the key and target units communicate directly with one another within a specified maximum distance. Unauthorized communication attempts over longer distances and/or with indirect signal transmission last longer, however, and thus can be detected by the communication duration monitoring means which then secure the target unit against this authentication attempt.

Other objects, advantages and novel features of the present invention will become apparent from the following detailed description of the invention when considered in conjunction with the accompanying drawings.

DETAILED DESCRIPTION OF THE DRAWINGS

Figure 1:
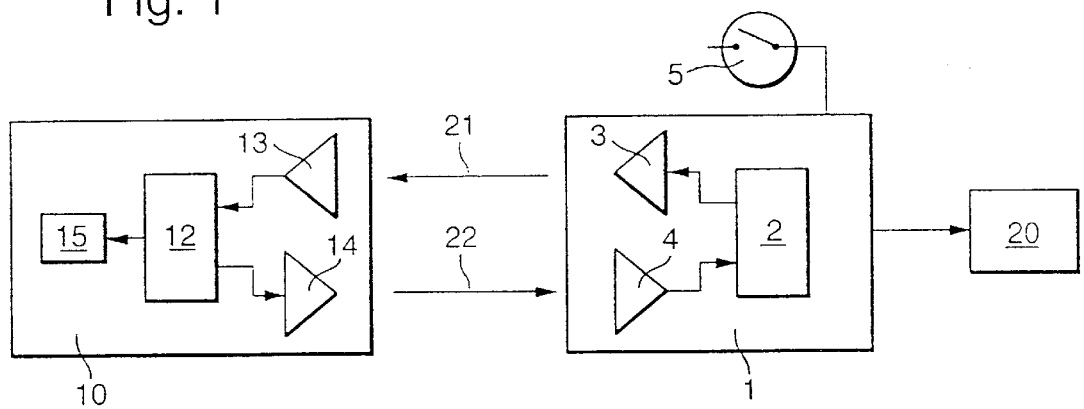
FIG. 1 is a block diagram of an authentication device with an arrangement for indicating that an authentication communication process is taking place.
Figure 2:
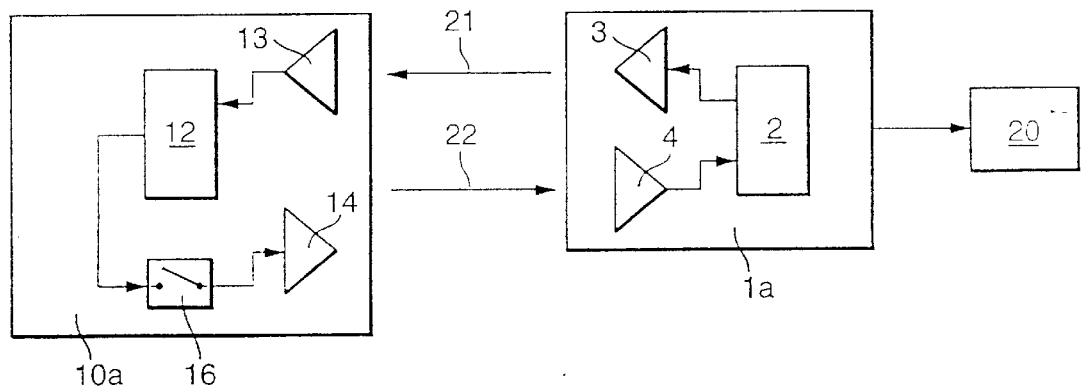
FIG. 2 is a block diagram of an authentication device with switching means on the key for authorizing or blocking authentication communication processes.
Figure 3:
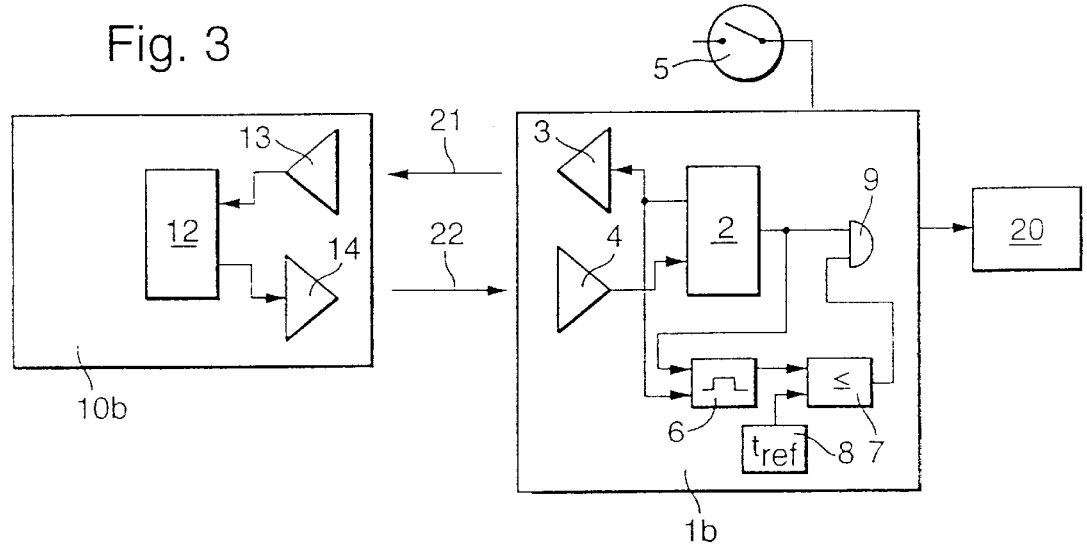
FIG. 3 is a block diagram of an authentication device with communication duration monitoring means.

The authentication devices shown in FIGS. 1 to 3 serve primarily as examples of how the actuation of a door-locking system of a motor vehicle can be allowed only by authorized persons. For this purpose, each authorized person receives an authentication key unit 10 (FIG. 1) with which he can identify himself to a door lock unit 1 on the vehicle (the authentication target unit) as being authorized. An authentication process is triggered for example by the actuation of a corresponding vehicle door handle by which a switch 5 connected with door lock unit 1 is actuated. Then a control and test unit 2 of door lock unit 1 generates random number information and sends this via a transmitter 3 as an interrogation signal 21 via a wireless communication channel, by induction for example.

When a key unit 10 is located sufficiently close to door lock unit 1, it can pick up this signal 21 by a receiver 13 which transmits said signal to a control and encoding unit 12 where the random number information is encoded. The encoded random number information is then transmitted by a transmitter 14 as encoded authentication signal 22 and can be received by a receiver 4 on door lock unit 1. The latter feeds the signal to control and test unit 2 for decoding and verification. If the authentication signal is recognized as correct, in other words when the received random number information after decoding matches the previously transmitted random number information, door lock unit 1 releases a door-locking unit 20 so that one or more associated vehicle doors can then be opened.

As protection against attempted manipulation, authentication key unit 10 has an optical and acoustic signaling device 15 that is activated by control and encoding unit 12 for a certain period of time, as soon as it receives an input signal from receiver 13. In this manner, the holder of key unit 10 receives an acoustic and optical indication of every authentication communication process that begins, and is thereby warned against possible unauthorized authentication attempts that he himself has not initiated.

The authentication device shown in FIG. 2 corresponds in design essentially to that in FIG. 1, with the same reference numbers being used for parts with the same functions for improved understanding, so that the description of FIG. 1 can be eliminated. In contrast to the device in FIG. 1, in a switching unit 16 is provided authentication key unit 10a in the signal path between control and encoding unit 12 and transmitter 14. Switching element 16 prevents the control and encoding unit 12 from delivering authentication signal 22 (with the encoded random number information) to transmitter 14 in response to the incoming signal 21 (with random number information) unless the switching element 16 has been actively actuated.

Switch element 16, for example, can be a pressure sensor or a foil-type button which is actuated only when a mechanical key part of key unit 10a is inserted or turned in a mechanical lock part of door lock unit 1a in the course of mechanical key-lock manipulation. If, on the other hand, the key unit is simply in the user's clothing, and is not being used, switch element 16 is not actuated and key unit 10a is consequently blocked to authentication communication processes, so that communication processes unnoticed and undesired by the user are not possible with key unit 10a.

As an alternative to this design of switching element 16 as a switch that automatically operates during the operation of a mechanical key part in a mechanical lock part, the switching element can be made independent therefrom by using a slide switch operable by the user, such a switch can be moved by the user (when he perceives danger for example) into the switch state in which key unit 10a remains blocked against authentication communication processes. The acoustical and optical warning message provided in the device in FIG. 1 when communication processes are taking place involving signal transmitter 15 can be missing from the device in FIG. 2 or can be provided, if desired, in addition to the protective measure represented by switching element 16.

FIG. 3 shows another authentication device whose design again corresponds essentially to that in FIGS. 1 and 2, with functionally identical parts again being given the same reference numbers, so that the above description can likewise be omitted. In contrast to the devices in FIGS. 1 and 2, in the device in FIG. 3 communication duration monitoring means are provided in door lock unit 1b. These means incorporate for example a time-measuring device 6 that is started each time the introductory communication signal 21 is delivered by door lock unit 1b. For this purpose, time-measuring device 6 is connected on the input side with the connecting lead between control and test unit 2 and transmitter 3. Time measurement by time-measuring device 6 is stopped as soon as encoded authentication response signal 22 is received through receiver 4 in door lock unit 1b and has been decoded and verified by control and test unit 2.

The release signal that is delivered by control and test unit 2 in the event of an authentication recognized as authorized is fed firstly to an AND member 9 and secondly to time-measuring device 6 as a time-measuring stop signal. Time-measuring device 6 feeds the measured duration to a comparator 7 that compares it with a maximum duration ($T_{ref}$) stored in a memory 8 as a reference value. Only when the measured time does not exceed the predetermined maximum duration ($T_{ref}$) does comparator 7 generate a release signal that is supplied to a second input on AND member 9. AND member 9 then generates the release signal for the door-locking unit 20 precisely when the release signals from control and test unit 2 and from comparator 7 are applied to its two inputs.

This means that unlocking of the door locks involved is authorized only when authentication has proceeded successfully and the duration of the electronic authentication communication process does not exceed the predetermined maximum duration. This maximum duration ($T_{ref}$) is set so that the normal communication processes that take place directly within a certain distance between key unit 10b and door lock unit 1b can proceed within this time period, while unauthorized authentication communications that extend over a longer distance or involve additional signal conversions last longer and therefore cannot result in a successful release of the door-locking system.

It is understood that the device in FIG. 3, in a manner not shown, can incorporate when necessary in its respective authentication key unit (10b) the acoustic and optical signal generator 15 corresponding to the device in FIG. 1 for delivering a communication warning message, and/or the switching element 16 corresponding to the device of FIG. 2 as a further protective measure against unauthorized activation of electronic authentication communications processes between the key unit and the door lock unit.

It is also understood that authentication devices according to the invention can be used not only as described for authentication in door-locking systems and electronic anti-theft systems of motor vehicles but also outside of motor vehicle technology, wherever there is a need for a comfortable usage authorization test reliably protected against misuse with respect to an authentication target unit using an authentication key unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An authentication device for an electronic authentication communication system, comprising:

an authentication target unit;

an authentication key unit for authenticating an authorized user for the authentication target unit, said key unit communicating electronically with the target unit in an electronic authentication communication process, which communication process is initiated automatically by one of the key unit's approaching the target unit, and actuation of a triggering element provided on the target unit; and at least one of an indicator provided on the authentication key unit that indicates that an authentication communication process is taking place; or a switch element provided on the authentication key unit to authorize or block an authentication communication process.

2. Authentication device according to claim 1, wherein said indicator comprises at least one of an acoustic signal transmitter and an optical signal transmitter that is activated for a preset period of time when an authentication communication process is initiated.

3. Authentication device according to claim 1, further comprising:

an arrangement for mechanical authentication actuation of the authentication key unit on the authentication target unit as a prerequisite for activation of an electronic authentication communication process, wherein the switching element is also operated as a result of the mechanical authentication actuation of the key unit on the target unit, and thereby authorizes an electronic authentication communication process that it would otherwise block.

4. Authentication device according to claim 2, further comprising:

an arrangement for mechanical authentication actuation of the authentication key unit on the authentication target unit as a prerequisite for activation of an electronic authentication communication process, wherein the switching element is also operated as a result of the mechanical authentication actuation of the key unit on the target unit, and thereby authorizes an electronic authentication communication process that it would otherwise block.

5. An authentication device for an electronic authentication communication system, comprising:

an authentication target unit;

an authentication key unit for authenticating an authorized user for the authentication target unit, said key unit communicating electronically with the target unit in an electronic authentication communication process, which communication process is initiated automatically by one of the key unit's approaching the target unit, and actuation of a triggering element provided on the target unit; and a communications duration monitoring arrangement provided on the authentication target unit, which monitors the duration of an authentication communication process and blocks authentication if the duration of the authentication communication process exceeds a time period of a predetermined maximum duration, which time period commences at the beginning of an authentication communication and continued for said predetermined maximum duration.

6. Authentication device according to claim 5, wherein a maximum duration provided for the communication duration monitoring arrangement is adjusted to an authentication communication process within a certain maximum distance and with direct communication signal transmission between the key unit and the target unit.

7. An authentication key for an electronic authentication communication system, said key comprising:

means for communicating electronically with a target unit to authenticate a holder of the key as an authorized user of the target unit, electronic authentication communications from the key to the target unit being initiated automatically by one of the key unit's approaching the target unit, and actuation of a triggering element provided on the target unit; and at least one of an indicator provided on the authentication key unit that indicates that an authentication communication process is taking place; or a switch element provided on the authentication key unit to authorize or block an authentication communication process.

8. An authentication key for an electronic authentication communication system, said key comprising:

means for communicating electronically with a target unit to authenticate a holder of the key as an authorized user of the target unit, electronic authentication communications from the key to the target unit being initiated automatically by one of the key unit's approaching the target unit, and actuation of a triggering element provided on the target unit; and a communications duration monitoring arrangement provided on the authentication target unit, which monitors the duration of an authentication communication process and blocks authentication if the duration of the authentication communication process exceeds a time period of a predetermined maximum duration, which time period commences at the beginning of an authentication communication and continued for said predetermined maximum duration.

* * * * *